United States Patent
Golitschek et al.

(10) Patent No.: US 7,095,797 B2
(45) Date of Patent: Aug. 22, 2006

(54) METHOD OF MODULATING A DATA SIGNAL WITH MODULATION SWITCHING BETWEEN DIRECT AND DIFFERENTIAL MODULATION AND APPARATUS FOR MODULATION

(75) Inventors: Alexander Golitschek, Langen (DE); Christian Wengerter, Langen (DE); Eiko Seidel, Langen (DE)

(73) Assignee: Matsushita Electric Industrial Co., Ltd., Osaka (JP)

( * ) Notice: Subject to any disclaimer, the term of this patent is extended or adjusted under 35 U.S.C. 154(b) by 736 days.

(21) Appl. No.: 10/214,455

(22) Filed: Aug. 8, 2002

(65) Prior Publication Data

US 2004/0028147 A1    Feb. 12, 2004

(30) Foreign Application Priority Data

Aug. 17, 2001   (EP)   .................................. 01119952

(51) Int. Cl.
    *H04L 27/04*   (2006.01)
(52) U.S. Cl. ....................................... 375/295; 375/296
(58) Field of Classification Search ................ 375/260, 375/286, 295, 298–308, 268–283, 261, 377; 332/100, 103
See application file for complete search history.

(56) References Cited

U.S. PATENT DOCUMENTS

| | | | |
|---|---|---|---|
| 3,333,055 A * | 7/1967 | Krause | ....................... 348/618 |
| 4,387,461 A | 6/1983 | Evans | |
| 5,909,466 A | 6/1999 | Labat et al. | |
| 6,262,994 B1 * | 7/2001 | Dirschedl et al. | ............ 370/465 |
| 6,384,596 B1 * | 5/2002 | Beyer | ..................... 324/207.16 |
| 6,567,475 B1 * | 5/2003 | Dent et al. | .................... 375/286 |
| 6,985,538 B1 * | 1/2006 | Murakami et al. | ........... 375/280 |
| 2001/0017896 A1 * | 8/2001 | Murakami et al. | ........... 375/260 |

FOREIGN PATENT DOCUMENTS

| | | |
|---|---|---|
| EP | 1043873 | 10/2000 |
| EP | 1083718 | 3/2001 |
| JP | 6472650 | 3/1989 |
| JP | 06152665 | 5/1994 |
| JP | 6507763 | 9/1994 |
| JP | 11234357 | 8/1999 |
| WO | 0076109 | 12/2000 |

* cited by examiner

*Primary Examiner*—Tesfaldet Bocure
(74) *Attorney, Agent, or Firm*—Stevens, Davis, Miller & Mosher, LLP

(57) ABSTRACT

A method and apparatus for modulating a data signal for transmission over a channel of a communication system, wherein a direct modulation scheme is applied to a data signal over a given first signal interval. Subsequently, a control measure is determined for switching the modulation scheme for the data signal from the direct modulation scheme to a differential modulation scheme and/or vice versa, which is applied to the data signal over a given second signal interval.

10 Claims, 4 Drawing Sheets

Figure 1:
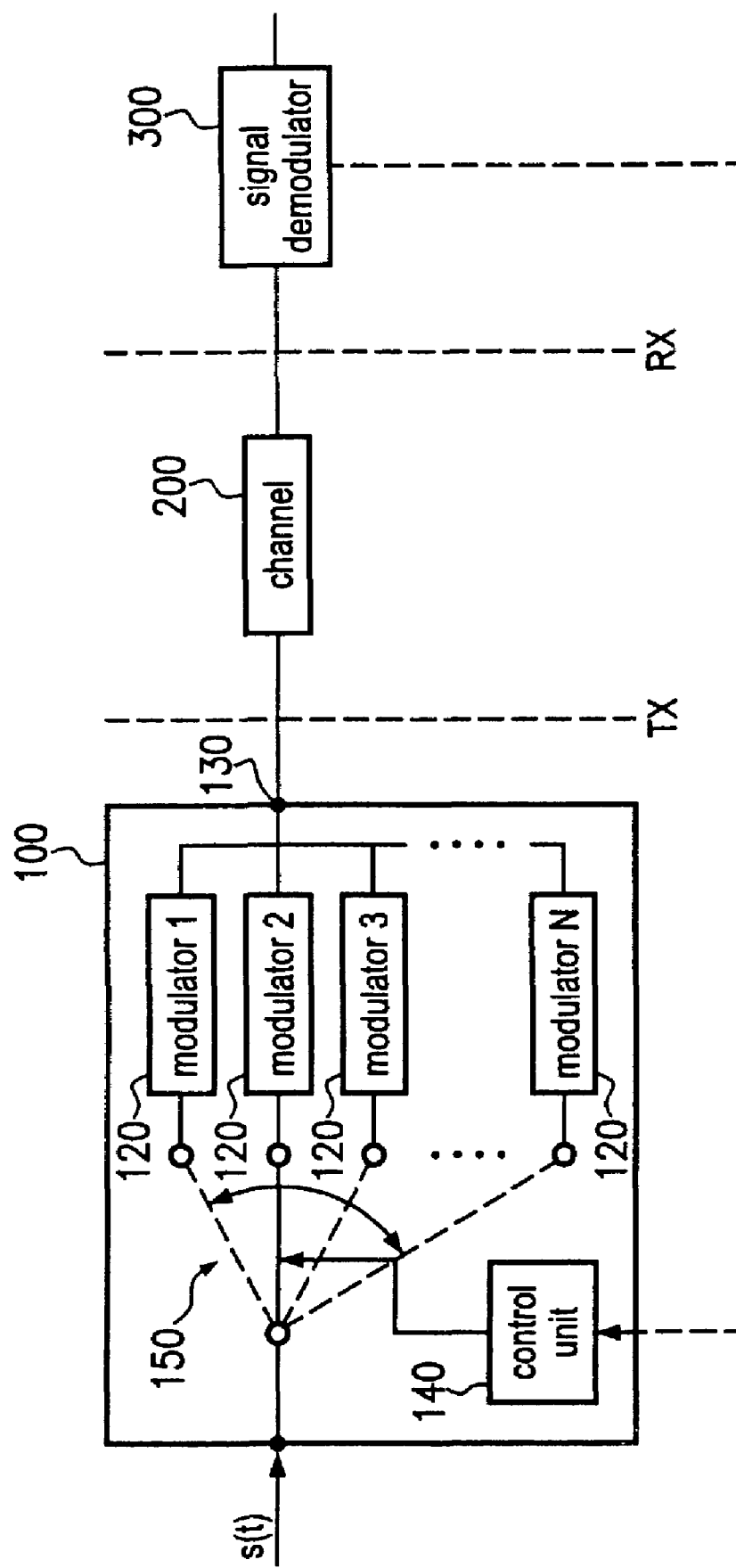

METHOD OF MODULATING A DATA SIGNAL WITH MODULATION SWITCHING BETWEEN DIRECT AND DIFFERENTIAL MODULATION AND APPARATUS FOR MODULATION

The present invention relates to a method of modulating a data signal for transmission over a channel of a communication system with modulation switching between direct and differential modulation or vice versa. Further, the invention relates to a corresponding apparatus for modulation.

In communication systems, a common method for transmitting high data rates is to use modulation techniques. A couple of techniques have evolved, which are suitable according to the specific characteristics of the communication system. Standardization organizations, such as ITU, have issued a number of recommendations for modulations to reach high data transmission rates.

Commonly, modulation schemes are classified as either direct or differential modulation schemes. Direct modulation, also known as memoryless modulation, implies that the data symbol to be transmitted is derived only from the actual input to a modulator without taking previously transmitted symbols into account. In order to demodulate the symbols, some independent references are needed, e.g. pilot symbols or training sequences. Examples of direct modulation schemes are BPSK, QPSK, PAM, ASK, PSK, QAM, or combinations thereof, such as known, e.g. from Proakis, John G. "Digital Communications", $4^{th}$ edition, 2001, McGraw-Hill, ISBN 0-07-118183-0 or Xiong, Fuqin, "Digital Modulation Techniques", 2000, Artec House Inc., ISBN 0-89 006-970-0.

In differential modulation schemes, also known as modulation with memory, the transmit symbol is formed from the actual input symbols as well as from the previously transmitted data, examples are, DBPSK, DQPSK, DPSK, DQAM. This technique requires previously transmitted data as reference.

One advantage of direct modulation is its robustness against noise and interference. On the other hand, for fading channels, differential modulation is advantageous. In direct modulation, part of the transmission resource has to be spent on some kind of reference signal, for example, pilot symbols. In contrast thereto, differential modulation does not require an extra reference signal, since its reference is the traffic signal itself. This allows for the whole transmission resource to be used for the actual traffic signal. When differential modulation is used, the amount of reference signal, which is required for direct modulation transmission, can be reduced or removed altogether. The amount saved can be used, for example, to add redundancy, which again improves the overall performance of the transmission, for example, by using FEC (Forward Error Coding) in the system.

When direct modulation is used, some sort of the knowledge of the transmission channel is necessary in order to demodulate the signal correctly. However, under certain conditions, when the transmission channel experiences fading or interference, for example, in mobile or satellite communication systems, the demodulation performance degrades severely. In such cases, it is advantageous to use differential modulation, which requires less accurate or no channel knowledge for demodulation. On the other hand, when channel knowledge is reliable, it is advantageous to use direct modulation.

This object of the present invention is to provide a modulating method and apparatus which is able to employ the optimum modulation scheme for each condition of the communication system.

This object is solved by a modulating method comprising the steps as set forth in claim 1. The invention also provides a modulation apparatus comprising the features of claim 9. According to the method and apparatus of the present invention, it is possible to select that modulation scheme, which, from a performance point of view, is best suited to arising conditions, for example, the detected channel quality. The switching operation is governed in accordance with a corresponding control measure. Hence, the method selects either direct or differential modulation and switches from direct to differential and/or vice versa. While direct modulation is suitable with good knowledge of the channel, differential modulation has advantages when the carrier phase is unknown.

The kind of control measure, which applied to switch the modulation schemes, depends on the actual used schemes in the communication system. How the control measure is obtained in the communication system and implementation issues are beyond the scope of the present invention. However, as a preferred method, the channel quality is estimated, for example, by determining the deviation in phase or amplitude of the modulation symbol. Alternatively, a combination of these two measures is appropriate.

As a further preferred embodiment, the control measure is obtained by comparing the phase or amplitude variation with predetermined thresholds. On the other hand, the thresholds can vary dynamically depending on the noise and/or interference in the communication channel.

According to an advantageous embodiment, the switching of the modulation scheme includes a hysteresis-like behavior in order to avoid frequent unnecessary switching.

Figure 2:
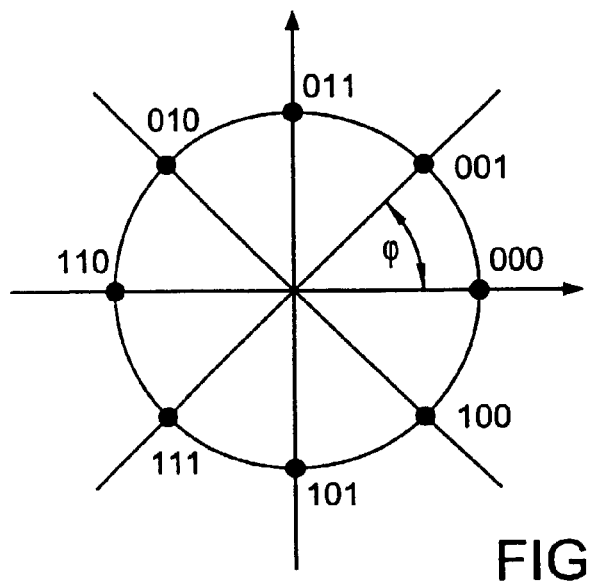
Figure 4:
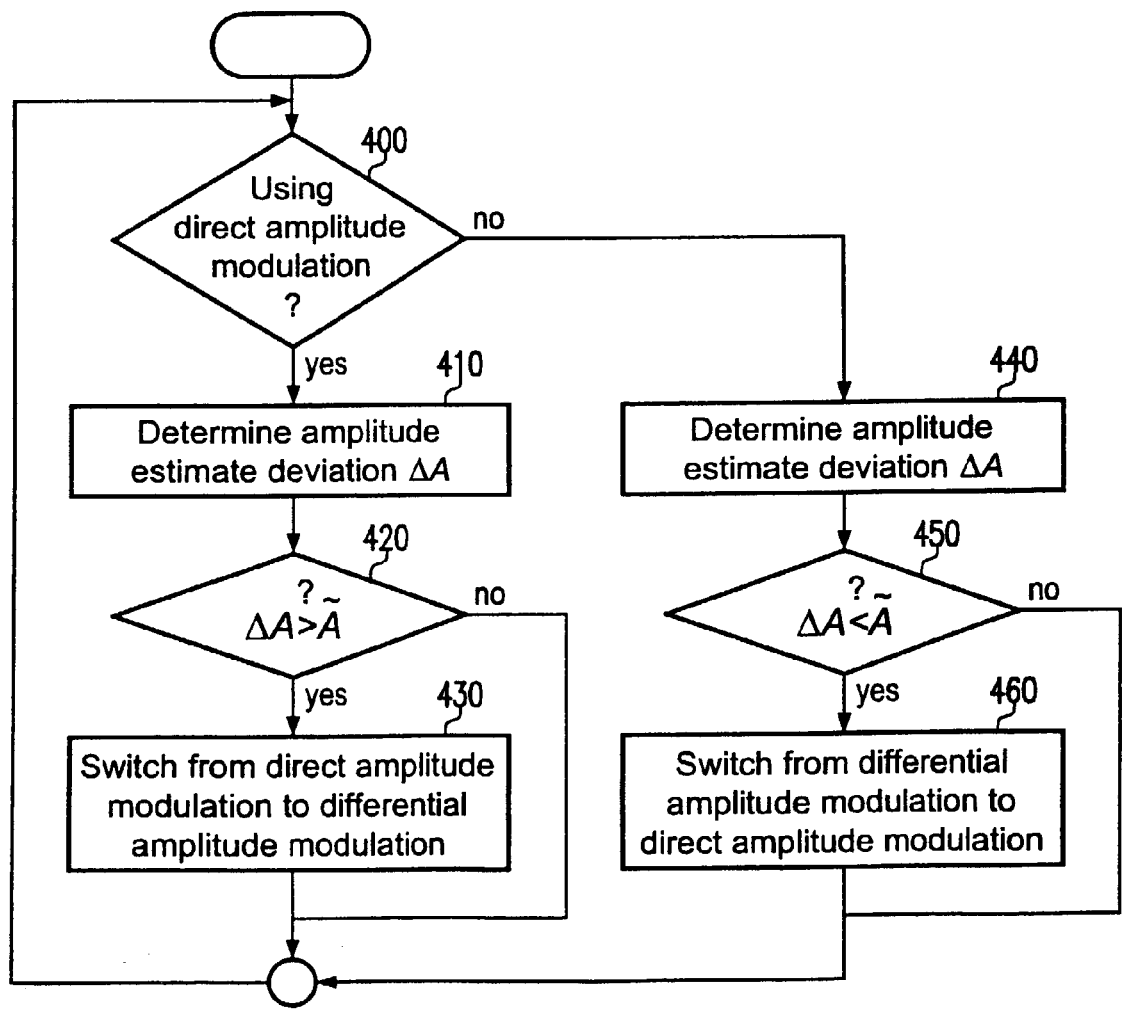
Figure 3:
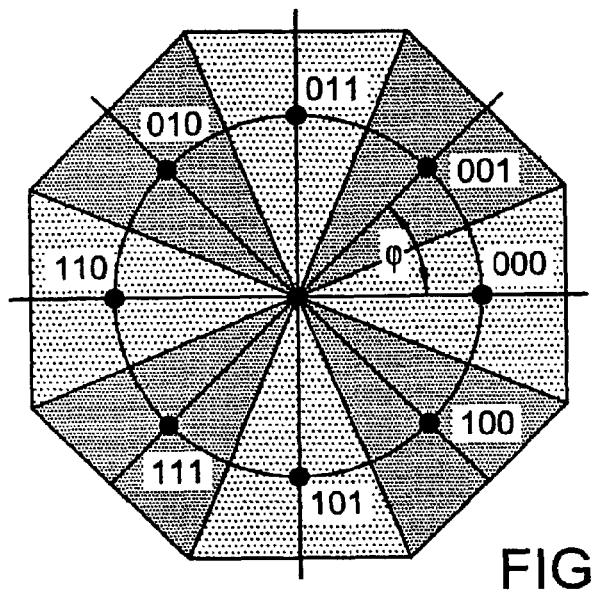
Figure 5:
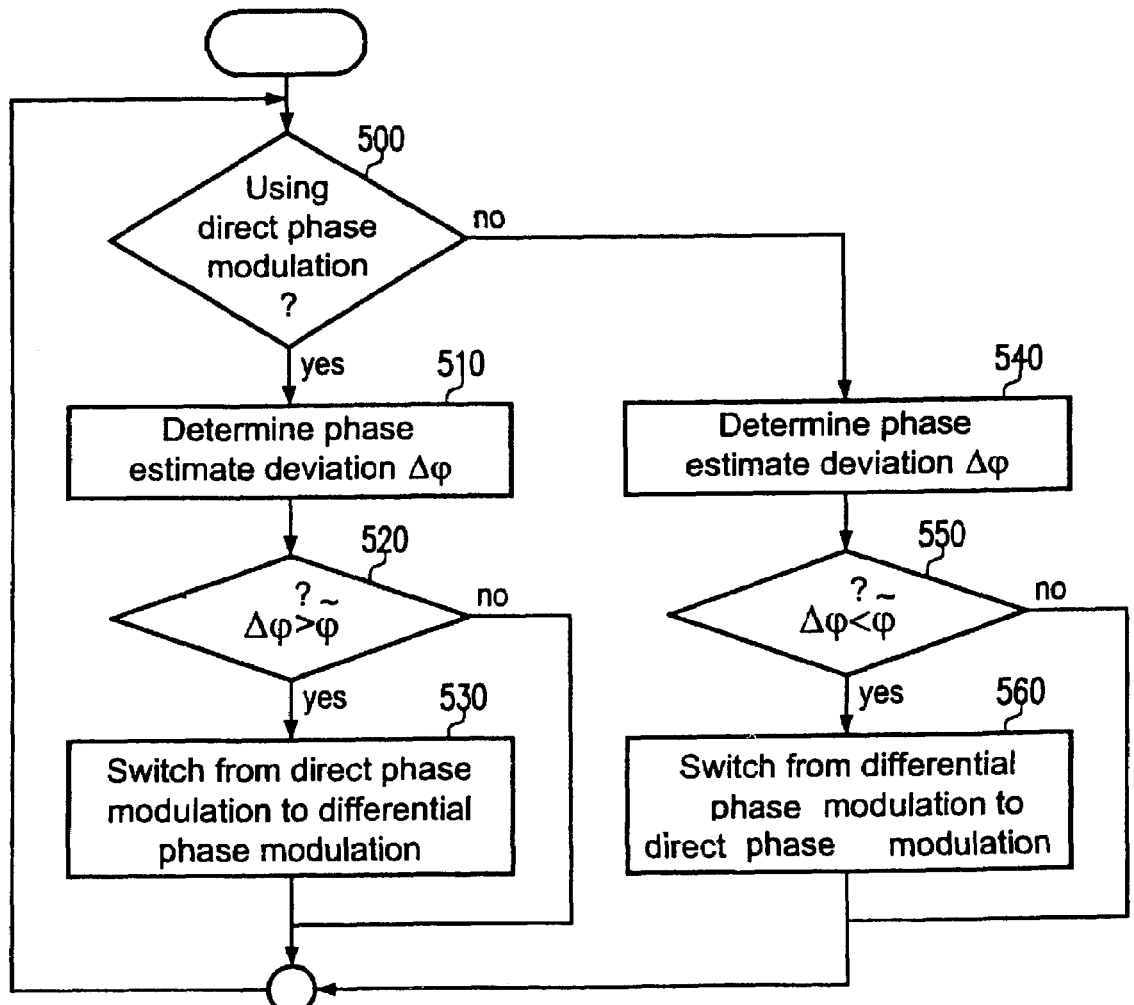
Figure 6:
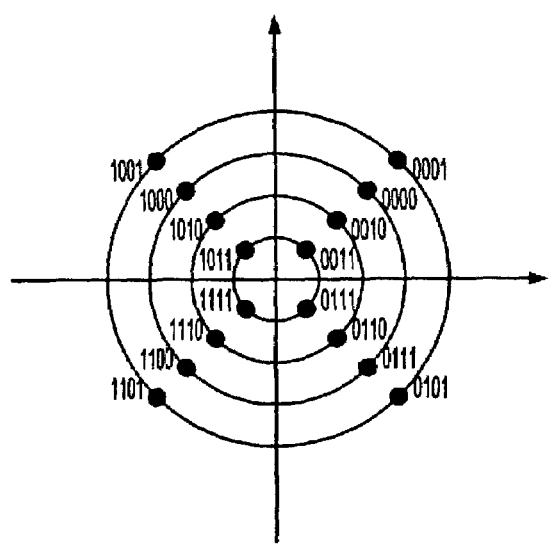
Figure 7:
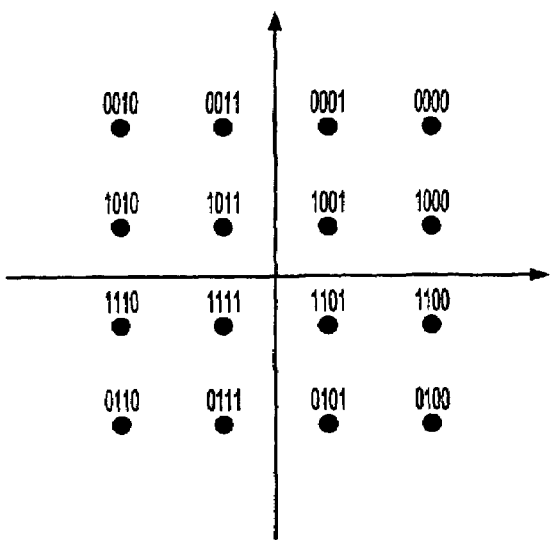

The features of the present invention will become readily apparent in the following detailed description of the invention, with reference to the accompanying drawings which show:

FIG. 1: a block diagram exemplifying the relevant parts of a communication signal modulator on the transmitting side, the transmission channel and the signal demodulator on the receiver side;

FIG. 2: an exemplary modulation constellation for 8-PSK;

FIG. 3: decision boundaries and regions for the signal constellation of FIG. 2;

FIG. 4: a flowchart for illustrating switch between direct and differential amplitude modulation; and FIG. 5: a flowchart for illustrating an algorithm between direct and differential phase modulation;

FIG. 6: an example of a combined 4-ASK/4-PSK modulation constellation, also known as 16-star QAM;

FIG. 7: an example of 16-square QAM; and

Figure 8:
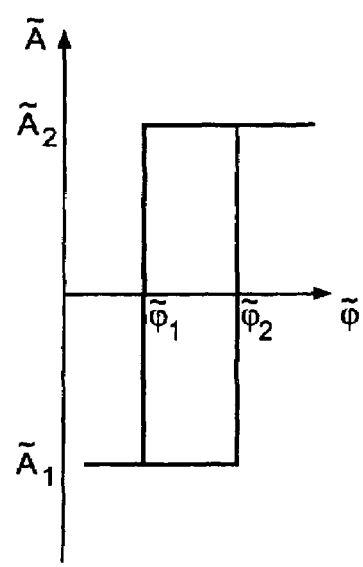

FIG. 8: an example of a hysteresis;

With reference to FIG. 1, parts of a communication system being of relevance to the present invention are illustrated. In more detail, a signal modulator 100 receives an input signal s(t). A switch unit 150 switches the input signal to one of N modulators 120, whose outputs are commonly connected to an output port 130. The plurality of shown modulators shall indicate that each modulator employs a different modulator scheme. Of course, the invention does not necessarily need these plurality of modulators. Rather, it could also uses a single modulator which is able to change the modulation scheme which is applied to the incoming signal. From the output port of the signal modulator 100, the data signal is transmitted in form of modulated symbols over a channel 200. The channel constitutes either a transmission line, such as narrow or a broad band cable or an air interface, in case of a mobile or satellite communication system. The signal is transmitted by the channel to the receiving side and subsequently demodulated in a signal demodulator 300.

The structure of the signal demodulator is beyond the scope of the present invention. For those skilled in the art, signal demodulators are known for the various above exemplarily mentioned modulation schemes.

Finally, the communication system provides a feedback loop (schematically shown in FIG. 1) for notifying the modulator on the quality of the channel, e.g. by means of error detection or measurement of the employed transmission power. The feedback signal is received by a control unit 140 which operates the switching unit 150. Depending on the channel condition, the most suitable modulation scheme can be selected on the transceiver side for modulating the data symbols by applying the input signal to the corresponding modulator.

FIG. 2 shows a signal space diagram for a 8-PSK modulation scheme. As apparent from the figure, 3 bits are grouped together as a modulation word resulting in a modulation word alphabet of eight distinct elements. A modulation word is mapped to the corresponding complex symbol according to the figure.

As shown in the constellation, the angular spacing between adjacent signal points is $\phi=2\pi/M$, whereas M is the total number of constellation points, in the example shown in the figure, M=8. During the demodulation process, the demodulator provides as an output that symbol lying closest to the received signal point. This rule is widely used to minimize the symbol error rate.

FIG. 3 shows the corresponding decision regions around the symbols. The term "deviation" is defined as the difference between the amplitude gain and the phase shift that occurs in the channel, on the one hand, and the respective estimated values in the receiver on the other hand. Considering a transmission system, where the channel estimation is the only error source, a channel phase estimation error of more than $\tilde{\phi}=|phase\_deviation|=\phi/2$ leads to erroneous demodulation. The equation reveals that the sign of the phase estimation error does not affect the error probability. Hence, the phase estimation error is assumed to be unsigned in the following.

From the above conclusion, the rule can be derived that when a channel phase estimation error of more than $\tilde{\phi}$ is detected, the modulation scheme should be changed from direct modulation to differential modulation. On the one hand, when the detected channel phase estimation error is less than $\tilde{\phi}$, then direct modulation should be used.

The procedure for switching amplitude modulation between a direct and differential modulation scheme is depicted in FIG. 4. Generally, the procedure is similar to that shown in FIG. 5 which is explained in greater detail below.

More specifically, in step 400, it is first determined whether direct or indirect amplitude modulation is presently used. In case direct amplitude modulation is used, the amplitude estimate deviation ΔA is determined (step 410) and subsequently, the deviation is compared to a threshold $\tilde{A}$ in step 420. If the deviation is larger than the threshold, a switch operation 430 from direct to differential modulation is effected.

On the other hand, if the determined estimate amplitude is smaller than the threshold $\tilde{A}$ (steps 440, 450), a corresponding switch from differential to direct modulation is done.

Furthermore, if during direct amplitude modulation, the deviation does not reach the threshold or is below same, no switch is accomplished and when using differential amplitude modulation, a deviation larger than the threshold does not result in a switchover operation.

This approach can be derived for amplitude-modulation techniques, such as ASK or PAM modulation. In this case, the channel amplitude estimation error $\tilde{A}$ is taken into account. Since the sign of the amplitude deviation is unimportant, it is assumed to be unsigned, $\tilde{A}=|amplitude\_deviation|$. If the distance between two adjacent points is defined as A, then the amplitude switching threshold which would be $\tilde{A}=A/2$.

The procedure for selecting either direct or differential phase modulation is shown in FIG. 5. As the first step 500, it is determined whether currently direct or indirect modulation is used. In the case of using direct phase modulation, the phase estimate deviation, the $\Delta\phi$ is determined in step 510. In case the determined deviation exceeds the threshold, which is determined in step 520, a switch from direct modulation to different phase modulation is carried out (step 530).

On the other hand, if the phase estimate deviation $\Delta\phi$ is less than the threshold $\tilde{\phi}$ in step 520, a switch of modulation scheme is unnecessary.

If step 500 reveals that differential modulation is presently used, in step 540, the phase estimate deviation $\Delta\phi$ is determined and subsequently, in step 550, compared against the threshold $\tilde{\phi}$. If the phase estimate deviation is smaller than the threshold $\tilde{\phi}$, switch from differential to direct phase modulation is conducted in step 560. If the deviation $\Delta\phi$ is larger than the threshold $\tilde{\phi}$, no switch is necessary and the differential phase modulation scheme is maintained.

The present invention can also be used to combine amplitude and phase modulations. If the amplitude part of a modulation symbol is independent of the phase part, then each part can be accessed for switching the modulation mode independently as illustrated above with regard to FIGS. 4 and 5. For example, the invention is applicable to a communication system, where two bits are modulated using ASK and two more bits using PSK. All four bits are jointly mapped onto one symbol, see FIG. 6, where two bits denote the amplitude level and two bits denote the phase level. When the amplitude deviation is higher than the amplitude threshold, while the phase deviation is below the phase threshold, differential amplitude modulation combined with direct phase modulation can be used.

When amplitude and phase do not constitute a modulation symbol independently, such as square QAM, see FIG. 7, both amplitude and phase estimation errors are required for the switching criterion, which then switches between direct QAM and differential QAM.

Generally, it is suggested to select the threshold levels to be conservative towards the direct modulation, as it is more resistant to noise. In other words, switching to differential modulation should only be done when both phase and amplitude deviation exceed the respective thresholds simultaneously. The amplitude and phase thresholds do not necessarily have to be fixed, but depending on the communication where the present invention is applied, an optimal threshold value can be selected within a certain range. For phase modulation, under the assumption that the maximum phase difference between two constellation points is $\phi_{max}$, the phase threshold interval can be selected as $$\tilde{\varphi} \in \left[0; \frac{\varphi_{\max}}{M/2}\right],$$

wherein M denotes the total number of constellation points. For amplitude modulation, under the assumption that the maximum amplitude difference between two constellation points is $A_{max}$, the amplitude threshold interval is $$\tilde{A} \in \left[0; \frac{A_{\max}}{M-1}\right].$$

These intervals result from the fact that the control measure itself is a measured or estimated quantity, i.e. suffers from measurement errors itself.

$\tilde{A}$ and $\tilde{\varphi}$ can also be determined dynamically within the system. For example, they can depend on the amount of noise or interference. Since it is known that differential modulation is more sensitive to noise, it makes sense to increase the threshold towards higher values when noise influence is high, i.e. switching is done for relatively higher deviations.

It can also be desirable to reduce a hysteresis-like switching behavior, as shown in FIG. 8. This means that the threshold for switching from direct to differential modulation (e.g. $\tilde{A}_2$, $\tilde{\varphi}_2$) is not necessarily identical to the threshold for switching from differential to direct modulation (e.g. $\tilde{A}_1$, $\tilde{\varphi}_1$).

As the number of switching processes can be very high, a hysteresis is applied as it is desirable for a communication system to rest for a certain period of time within either direct or differential modulation. Further, determining the deviation can be erroneous under noisy or rapidly varying conditions. Therefore, it can be beneficial to introduce a hysteresis to reduce the probability of erroneous switching.

Finally, hysteresis switching is particularly applicable when the direct modulation and differential modulation do not follow the same approach, e.g. a direct 8-PSK and a differential 16-PSK. Again, each of the thresholds can be within an interval or dynamically determined as described above.

It should also be noted that the figures depict only the theoretical behaviour. In implementation, some variations are possible. For example, the determination of the deviation can be done even before the considering whether the currently used mode is direct or differential.

This invention relates theoretically to all kinds of modulation methods. However, for the purpose of this description, only the detailed solution for an 8-PSK modulation was presented. Nonetheless, finding appropriate thresholds for other modulations is a trivial task when following the threshold derivation described.

The invention claimed is:

1. A method of modulating a data signal for transmission over a channel of a communication system, the method comprising:
   determining whether a direct modulation scheme or a differential modulation scheme is being used;
   determining a phase deviation, an amplitude deviation, or both a phase deviation and an amplitude deviation of a received modulation symbol;
   judging whether the modulation scheme in use is to be switched or not based on the determined phase deviation, amplitude deviation, or both phase deviation and amplitude deviation; and
   switching from the modulation scheme in use to the other modulation scheme, between the direct modulation scheme and the differential modulation scheme, when it is judged that the modulation scheme in use is to be switched.

2. The data signal modulation method according to claim 1 wherein the direct modulation scheme is any one or a combination of PAM, ASK, PSK, and QAM.

3. The data signal modulation method according to claim 1, wherein the differential modulation scheme is either one or a combination of DPSK and DQAM.

4. The data signal modulation method according to claim 1 wherein the phase deviation, the amplitude deviation, or each of the phase deviation and the amplitude deviation are compared with a corresponding threshold to judge whether the modulation scheme in use is to be switched.

5. The data signal modulation method according to claim 4, wherein each respective threshold is dynamically determined within the communication system depending on noise, interference, or both noise and interference in a channel.

6. The data signal modulation method according to claim 4, wherein each respective threshold applied in judging whether to switch from the direct modulation scheme to the differential modulation scheme is different from each respective threshold applied in judging whether to switch from the differential modulation scheme to the direct modulation scheme.

7. The data signal modulation method according to claim 1, wherein the switching of the modulation scheme includes a hysteresis-like behavior.

8. An apparatus for modulating a data signal for transmission over a channel of a communication system, the apparatus comprising:
   a first modulator for applying a direct modulation scheme to the data signal;
   a second modulator for applying a differential modulation scheme to the data signal;
   a switching unit that switches the modulator to be used between the first modulator and the second modulator; and
   a control unit that operates said switching unit based on a phase deviation value, an amplitude deviation value, or both a phase deviation value and an amplitude deviation value of a received modulation symbol.

9. The data signal modulation apparatus according to claim 8, wherein said control unit comprises a comparator that compares the phase deviation value, the amplitude deviation value, or each of the phase deviation value and the amplitude deviation value with a corresponding threshold.

10. The data signal modulation apparatus according to claim 9, wherein said control unit comprises a means for storing a lower and an upper threshold for operating said switching unit with a hysteresis-like behavior.

* * * * *